United States Patent
Aoki

(10) Patent No.: US 9,634,302 B2
(45) Date of Patent: Apr. 25, 2017

(54) SECONDARY BATTERY MODULE

(75) Inventor: Sadayuki Aoki, Hitachinaka (JP)

(73) Assignee: HITACHI AUTOMOTIVE SYSTEMS, LTD., Tokyo (JP)

( * ) Notice: Subject to any disclaimer, the term of this patent is extended or adjusted under 35 U.S.C. 154(b) by 149 days.

(21) Appl. No.: 14/358,924

(22) PCT Filed: Nov. 18, 2011

(86) PCT No.: PCT/JP2011/076626
§ 371 (c)(1),
(2), (4) Date: May 16, 2014

(87) PCT Pub. No.: WO2013/073046
PCT Pub. Date: May 23, 2013

(65) Prior Publication Data
US 2014/0295227 A1 Oct. 2, 2014

(51) Int. Cl.
H01M 2/10 (2006.01)
H01M 2/12 (2006.01)
H01M 10/6557 (2014.01)
H01M 10/6554 (2014.01)
H01M 2/02 (2006.01)

(52) U.S. Cl.
CPC ....... *H01M 2/1016* (2013.01); *H01M 2/1061* (2013.01); *H01M 2/1077* (2013.01); *H01M 2/12* (2013.01); *H01M 10/6554* (2015.04); *H01M 10/6557* (2015.04); *H01M 2/0217* (2013.01)

(58) Field of Classification Search
None
See application file for complete search history.

(56) References Cited

U.S. PATENT DOCUMENTS

| 9,203,065 | B2* | 12/2015 | Kim | H01M 2/1077 |
| 2008/0280194 | A1* | 11/2008 | Okada | H01M 2/1077 429/99 |
| 2011/0281145 | A1* | 11/2011 | TenHouten | H01M 10/6567 429/50 |
| 2013/0183571 | A1* | 7/2013 | Miyazaki | H01M 2/1077 429/156 |

FOREIGN PATENT DOCUMENTS

| JP | 2004-349202 A | 12/2004 |
| JP | 2008-282582 A | 11/2008 |
| JP | 2010-092610 A | 4/2010 |
| JP | 2011-171029 A | 9/2011 |
| JP | 2011-228272 A | 11/2011 |

* cited by examiner

*Primary Examiner* — Patrick Ryan
*Assistant Examiner* — Carmen Lyles-Irving
(74) *Attorney, Agent, or Firm* — Volpe and Koenig, P.C.

(57) ABSTRACT

A secondary battery module includes a cell block in which a plurality of square batteries are layered, and includes: a pair of end plates arranged to respectively face one side and another side of the cell block in a layering direction; and a pair of side frames and arranged to respectively face one side and another side in a cell width direction perpendicular to the layering direction of the cell block, and in the one side and another side in the cell width direction, one end portion being engaged with one end plate at the one side in the layering direction, and other end portion being engaged with other end plate at another side in the layering direction.

12 Claims, 15 Drawing Sheets

SECONDARY BATTERY MODULE

TECHNICAL FIELD

The present invention relates to a secondary battery module including a plurality of battery cells, and capable of discharging and storing electrical energy.

BACKGROUND ART

PTL 1 discloses a structure of a metal band, an end portion of which is coupled with a pair of end plates arranged at both end surfaces of layered square batteries, and which fixes the square batteries in the layered state in a compressed state.

Further, PTL 2 discloses a structure of a battery pack structure, which includes a layered body in which a plurality of layered batteries is sandwiched by a first sandwiching member and a second sandwiching member, and a fastening member formed to accord with the dimension of the layered body, and an objective is to achieve a structure in which dimension change is less easily caused due to deformation of the fastening member.

CITATION LIST

Patent Literatures

PTL 1: JP 2008-282582 A
PTL 2: JP 2010-92610 A

SUMMARY OF INVENTION

Technical Problem

The secondary battery module described in PTL 1 fastens and fixes the square batteries in a layered and compressed state by the metal band. Therefore, when charging and discharging are repeated, the metal band is subject to force with a bulge of a battery cell, and force in a right angle direction always acts on the fastening direction, that is, a load is repeatedly applied to the metal band in a shearing direction, and thus looseness may be caused. Therefore, the initial binding force cannot be maintained in long-term use, and deterioration of the battery performance may be caused.

Further, the decrease in the binding force has substantial influence on the product reliability, which may cause looseness of a bus bar fastening portion or deformation. The structure described in PTL 2 has similar problems.

The present invention has been made in view of the foregoing, and an objective is to provide a secondary battery module having redundancy reliability, which fixes layered square batteries in an ideal state, and assembly work of which is easy.

Solution to Problem

In order to solve the above-described problem, the configurations described in the claims are employed, for example. The present invention includes a plurality of means to solve the above-described problem, an example thereof includes a secondary battery module including a cell block in which a plurality of square batteries is layered, the secondary battery module including: a pair of end plates arranged respectively facing one side and the other side of the cell block in a layering direction; and a pair of side frames arranged to respectively face one side and the other side in a cell width direction perpendicular to the layering direction of the cell block, and at the one side and the other side in the cell width direction, one end portion being engaged with the end plate at the one side in the layering direction and the other end portion being engaged with the end plate at the other side in the layering direction.

Advantageous Effects of Invention

According to the secondary battery module of the present invention, a plurality of layered square batteries can be fastened in an ideally state, assembly work is easy, a decrease in holding power due to passing of time is not caused, and the redundancy reliability can be obtained. Note that other problems, configurations, and effect other than the above will become clear from description of embodiments below.

DESCRIPTION OF EMBODIMENTS

Figure 1:
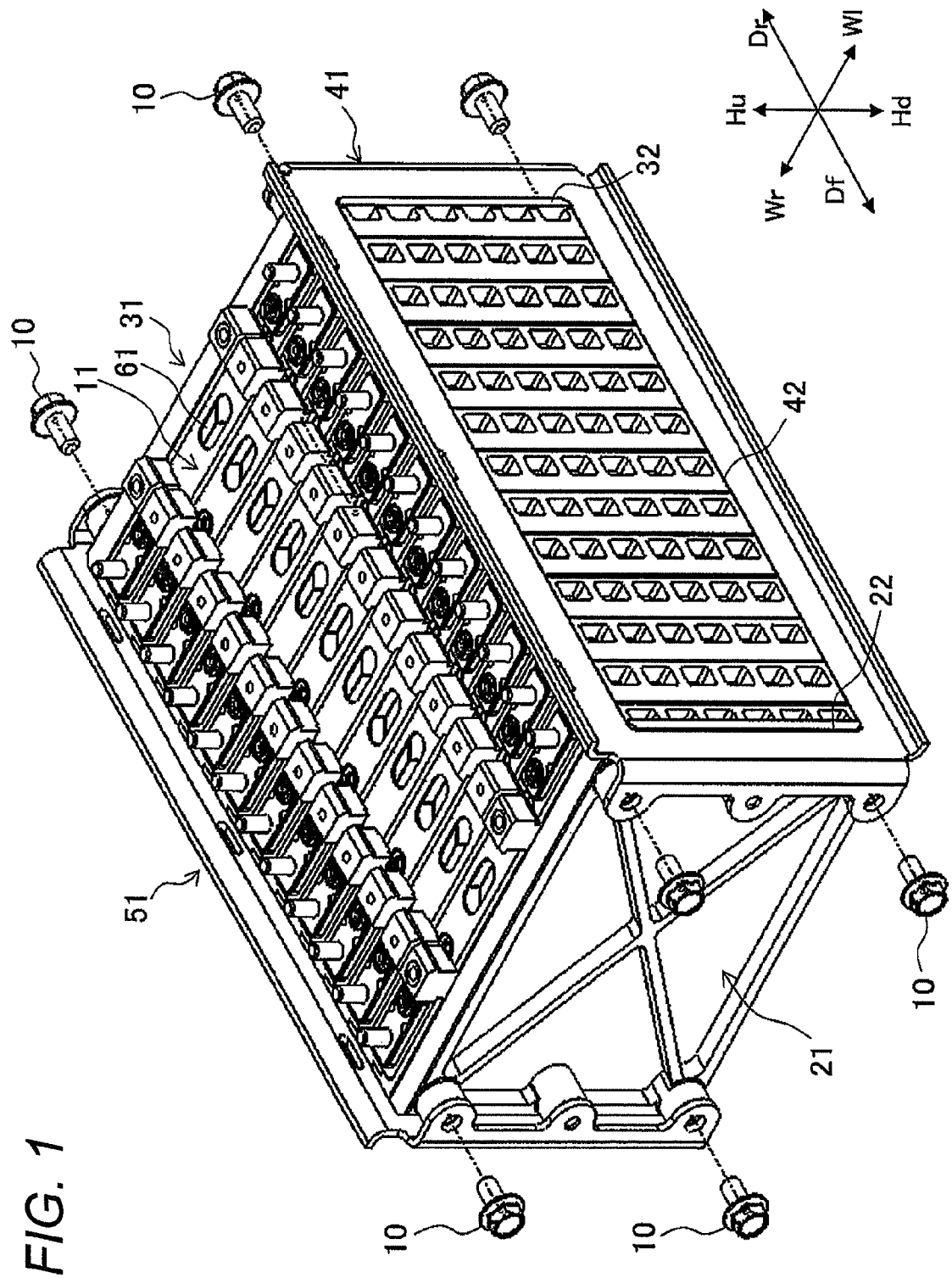
FIG. 1 is a perspective view illustrating an assembled state of a cell block.
Figure 2:
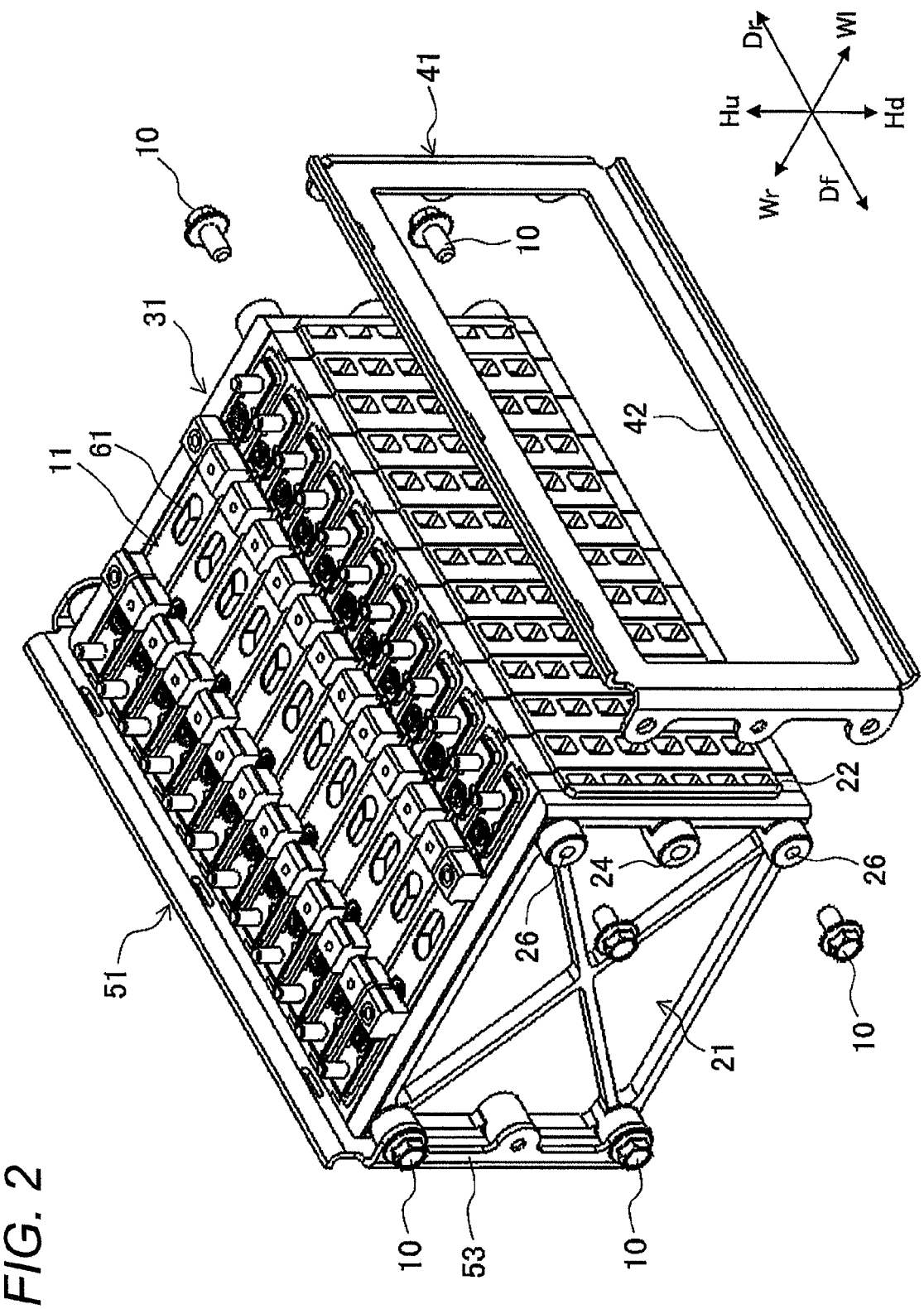
FIG. 2 is a perspective view illustrating a state in which one side frame is removed from the cell block.
Figure 3:
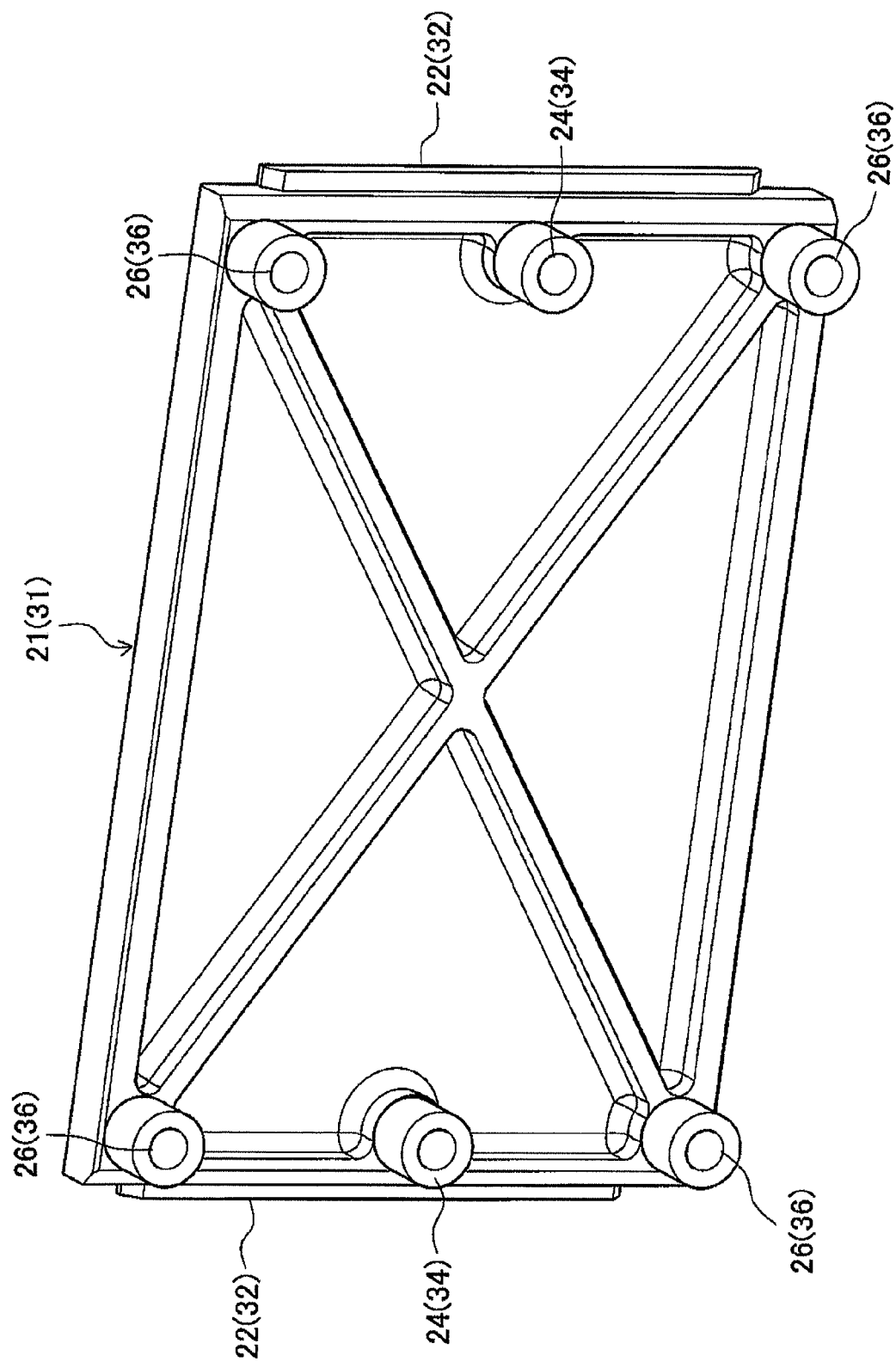
FIG. 3 is a perspective view of an end plate.
Figure 4:
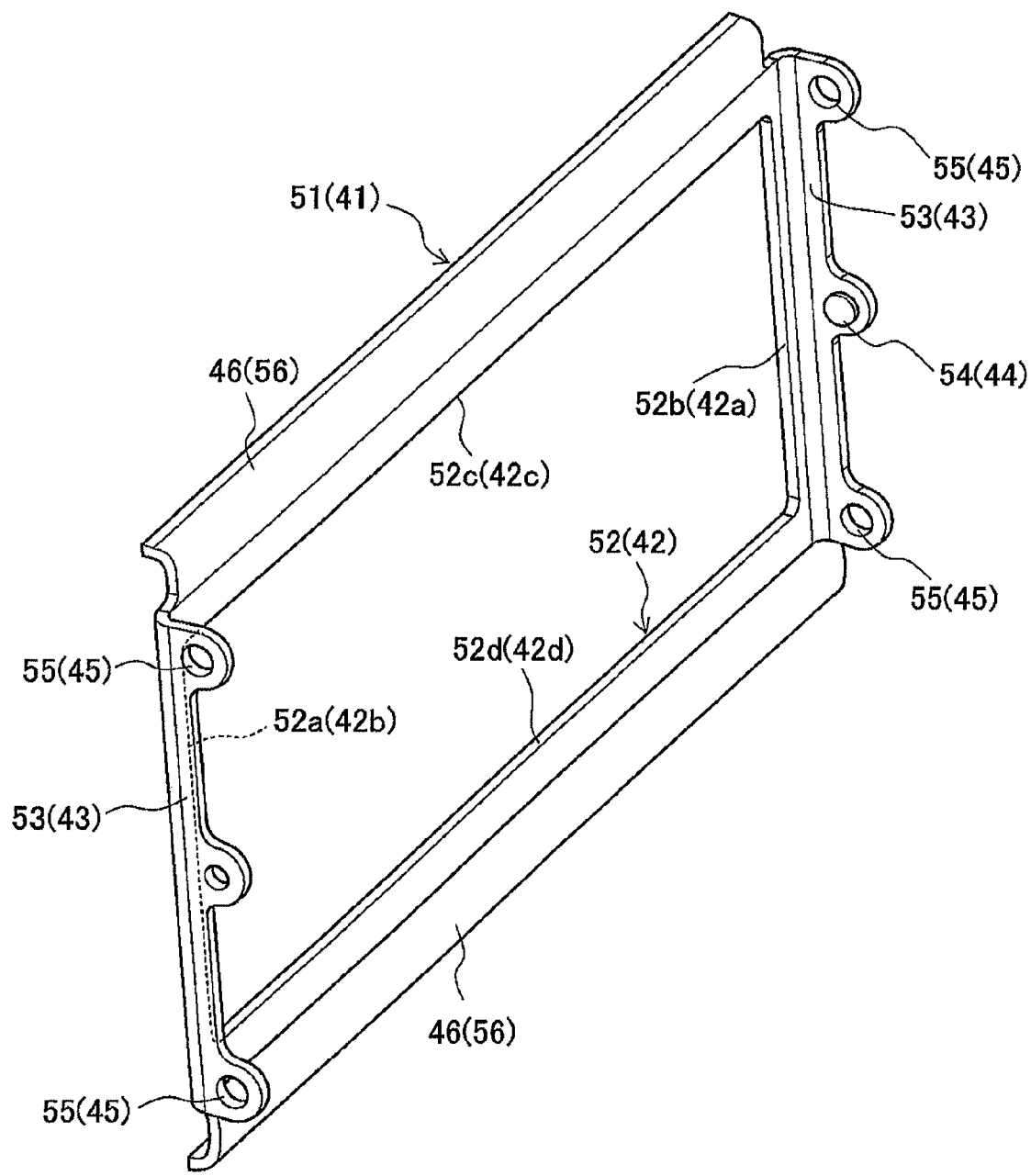
FIG. 4 is a perspective view of the side frame.

A present embodiment will be described below.
FIG. 1 is a perspective view illustrating an assembled state of cell blocks, FIG. 2 is a perspective view illustrating a state in which one side frame is removed from the cell blocks, FIG. 3 is a perspective view illustrating an end plate, and FIG. 4 is a perspective view of the side frame.

A cell block 11 is a main component that configures a secondary battery module 1 (see FIG. 15), and has a configuration in which a plurality of square batteries 61 is layered. The cell block 11 is firmly fastened while being layered by a pair of end plates 21 and 31, and a pair of side frames 41 and 51.

The pair of end plates 21 and 31 is arranged to respectively face one side Df and the other side Dr of the cell block 11 in a layering direction. The pair of side frames 41 and 51 is arranged to respectively face one side Wl and the other side Wr in a cell width direction perpendicular to the layering direction of the cell block 11. The pair of side frames 41 and 51 has a configuration that one end portions are engaged with the end plate 21 at the one side Df in the layering direction, and the other end portions are engaged with the end plate 31 at the other side Dr in the layering direction, at the one side Wl and the other side Wr in the cell width direction.

Protrusion portions 22 and 32 are respectively provided to the end plates 21 and 31 at the one side Wl and the other side Wr in the cell width direction. Between the pair of side frames 41 and 51, the side frame 41 at the one side Wl in the cell width direction includes an opening portion 42 that opens from the protrusion portion 22 at the one side Wl in the cell width direction included in the end plate 21 at the one side Df in the layering direction to the protrusion portion 32 at the one side Wl in the cell width direction included in the end plate 31 at the other side Dr in the layering direction, and into which the protrusion portions 22 and 32 of the end plates 21 and 31 at the one side Wl in the cell width direction are inserted.

The side frame 51 at the other side in the cell width direction includes an opening portion 52 that opens from the protrusion portion 23 at the other side Wr in the cell width direction included in the end plate 21 at the one side Df in the layering direction to the protrusion portion 32 at the other side Wr in the cell width direction included in the end plate 31 at the other side Dr in the layering direction, and into which the protrusion portions 23 and 32 of the end plates 21 and 31 at the other side Wr in the cell width direction are inserted.

The protrusion portions 22 and 32 of the end plates 21 and 31 at the one side Wl in the cell width direction are inserted into the opening portion 42 of the side frame 41 at the one side Wl in the cell width direction, and the protrusion portions 22 and 32 at the other side Wr in the cell width direction are inserted into the opening portion 52 of the side frame 51 at the other side Wr in the cell width direction, so that movement of the end plates 21 and 31 in directions mutually separating from the layering direction is restricted, and the end plates 21 and 31 firmly fasten the cell block 11 from both sides in the layering direction.

<End Plate>

Next, configurations of the end plates 21 and 31 will be described with reference to FIG. 3. Note that the end plate 31 has the same configuration as the end plate 21, and thus detailed description is omitted by indicating corresponding reference signs in the configuration with brackets.

The end plate 21 (31) has a rectangular flat plate shape having almost the same size as an end surface of the cell block 11 at the one side or the other side in the layering direction with a predetermined plate thickness. The end plate 21 (31) includes the protrusion portions 22 (32) respectively protruding into the one side Wl and the other side Wr in the cell width direction.

The protrusion portions 22 (32) extend along a cell height direction, and have a shape having almost the same protrusion dimension as the plate thickness of the side frames 41 and 51. The protrusion portions 22 (32) face and abut on end edge portions 42a and 52a at the one side in the layering direction, which configure the opening portions 42 and 52 when being inserted into the opening portions 42 and 52 of the side frames 41 and 51.

A locking hole 24 (34) and a screw hole (fastening hole) 26 (36) are provided in an outer end surface of the end plate 21 (31). The locking hole 24 (34) is a hole into which a locking claw 44 (54) of the side frame 41 (51) is inserted, and the screw hole 26 (36) fastens a fixing screw 10 that fixes the side frame 41 (51) to the end plate 21 (31).

A total of two locking holes 24 (34) are provided to position at both end portions of the end plate 21 (31) in the cell width direction and at an approximately central positions in the cell height direction. The locking holes 24 (34) are formed to be recessed in an outer end surface of the end plate 21 (31), and has a round hole shape having a predetermined depth. A total of four screw holes 26 (36) are provided to position at both end portions of the end plate 21 (31) in the cell width direction and at two separate positions of one side Hd and the other side Hu in the cell height direction.

Although not illustrated in the drawings, the locking method may be a combination opposite to the above description. That is, a structure in which the locking claws (protrusion shape) are formed in the 24 (34) portions of the outer end surface of the end plate 21 (31), and the locking holes are formed in the 54 (44) portions of the side frame 41 (51).

<Side Frame>

Next, configurations of the side frames 41 and 51 will be described with reference to FIG. 4. Note that, in the following description, only the configuration of the side frame 51 is described, and the configuration of the side frame 41 is the same as that of the side frame 51, and thus detailed description is omitted by indicating corresponding reference signs in the configuration with brackets.

The side frame 51 (41) is made of a plate member having an approximately rectangular shape in planar view, which faces and contacts with an end surface of the one side Wl or the other side Wr of the cell block 11 in the cell width direction, and has a size extending between the pair of end plates 21 and 31 with a certain height width slightly larger than the cell height of the cell block 11.

The opening portion 52 (42) opening from the one end portion to the other end portion with a certain height width is provided in the side frame 51 (41). The opening portion 52 (42) is formed into a rectangular opening along the shape of the side frame 51 (41) so that the end surface of the cell block 11 at the other side Wr in the cell width direction can be exposed.

The opening portion 52 (42) includes an upper edge portion 52c (42c) and a lower edge portion 52d (42d) extending in parallel between one end portion and the other end portion, and a pair of end edge portions 52a (42b) and 52b (42a) extending in parallel between one end portion and the other end portion along the height direction.

The pair of end edge portions 52a and 52b of the opening portion 52 faces and abuts on the protrusion portions 22 and 32 of the end plates 21 and 31 at the other side Wr in the cell width direction, at an outside position in the layering direction, and the pair of end edge portions 42a and 42b of the opening portion 42 faces and abuts on the protrusion portions 22 and 32 of the end plates 21 and 31 at the one side Wl in the cell width direction, at an outer side in the layering direction.

The side frame 51 (41) includes a pair of flanges 53 (43) respectively bending toward one end portion direction and the other end portion direction, and respectively facing an outer end surface of the end plate 21 at one side Df in the layering direction, and an outer end surface of the end plate 31 at the other side Dr in the layering direction.

A pair of locking claws 54 (44) and 54 (44) engageably inserted into the locking holes 24 and 34 of the end plates 21 and 31 is provided in the flange 53 (43). The locking claws 54 (44) protrude from surfaces facing the end plates 21 and 31 into a mutually approaching direction in a short-axis cylindrical manner, and have a dimension and shape engageably inserted into the locking holes 24 (34) of the end plates 21 and 31. By engageably inserting the locking claws 54 (44) into the locking holes 24 (34), the side frame 51 (41) can be fixed to the end plates 21 and 31.

Further, through holes 55 to which the fixing screw (fastening member) 10 are inserted is formed in the flange 53 (43). The through holes 55 (45) are continuously arranged to the screw holes 26 and 36 of the end plates 21 and 31 in a state that the side frame 51 (41) is attached, and can be screwed into the screw holes 26 and 36 by inserting the fixing screws 10 from an outside in the layering direction.

Note that, in the present embodiment, a fastening method using the fixing screw 10 has been described. However, fastening and fixing may be performed using a bolt, a rivet, or calking.

With the above configuration, the side frames 41 and 51 and the end plates 21 and 31 are engaged such that, first, the protrusion portions 22 and 32 are inserted into the opening portions 42 and 52, and the pair of end edge portions 42a and 42b of the opening portion 42 faces and abuts on the protrusion portions 22 and 32 of the end plates 21 and 31 at the one side W1 in the cell width direction one side W1 and the pair of end edge portions 52a and 52b of the opening portion 52 faces and abuts on the protrusion portions 22 and 32 of the end plates 21 and 31 at the other side Wr in the cell width direction.

In the engaged state, the locking claws 44 and 54 of the side frames 41 and 51 are inserted to the locking holes 24 and 34, and thus the side frames 41 and 51 are prevented from coming off the end plates 21 and 31.

Further, the side frames 41 and 51 and the end plates 21 and 31 are fastened by the fixing screws 10, and thus the side frames 41 and 51 and the end plates 21 and 31 can be reliably fixed. Even if the engagement of the protrusion portions 22 and 32 in the opening portion 52 is released with some cause, the cell block 11 can be firmly fastened and the layered state can be maintained.

A pair of reinforcement flanges 46 and 56 extending along an upper end portion and a lower end portion, respectively, is provided to each of the side frames 41 and 51, and has an approximately U-shaped cross section in a height direction. The reinforcement flanges 46 and 56 are formed such that the upper end portions and the lower end portions of the side frames 41 and 51 are subjected to flange bending processing in a direction away from the bending direction of the flanges 43 and 53.

The reinforcement flanges 46 and 56 can improve the rigidity of the side frames 41 and 51, and prevents deformation of the side frames 41 and 51. Therefore, the reinforcement flanges 46 and 56 can prevent engagement of the protrusion portions 22 and 32 of the end plates 21 and 31 from being released due to torsion of the side frames 41 and 51, or the like.

Note that the shapes of the cross sections of the side frames 41 and 51 are not limited to the above-described example, and any shape may be employed as long as the rigidity of the side frames 41 and 51 can be improved. For example, the side frame having an approximately L-shaped cross section may be employed by omitting the reinforcement flanges 46 at the lower end portions of the side frames 41 and 51 and employing only the reinforcement flanges 46 at the upper end portions, or the side frames may have a square pipe cross section.

<Cell Block>

Next, a configuration of the cell block 11 will be described.

The cell block 11 is configured from a plurality of square batteries 61 and a cell holder that holds the square batteries 61. The cell holder includes salient portions 84C and 94C inserted to the opening portions 42 and 52 of the pair of side frames 41 and 51, respectively, and engaged with the pair of side frames 41 and 51 at the one side W1 and the other side Wr of the cell block 11 in the cell width direction.

The cell holder includes a pair of end cell holders 81 and 81 intervening between the end plates 21 and 31 and the square batteries 61, respectively, and an intermediate cell holder 91 intervening between the square battery 61 at the one side Df in the layering direction and the square battery 61 at the other side Dr in the layering direction. A plurality of intermediate cell holders 91 can be coupled between the pair of end cell holders 81 and 81 in the layering direction. The end cell holder 81 and the intermediate cell holder 91, and the intermediate cell holders 91 are mutually coupled in the layering direction, so that the square batteries 61 are held in a state of being put in from both sides in the layering direction.

<Square Battery>

Figure 5:
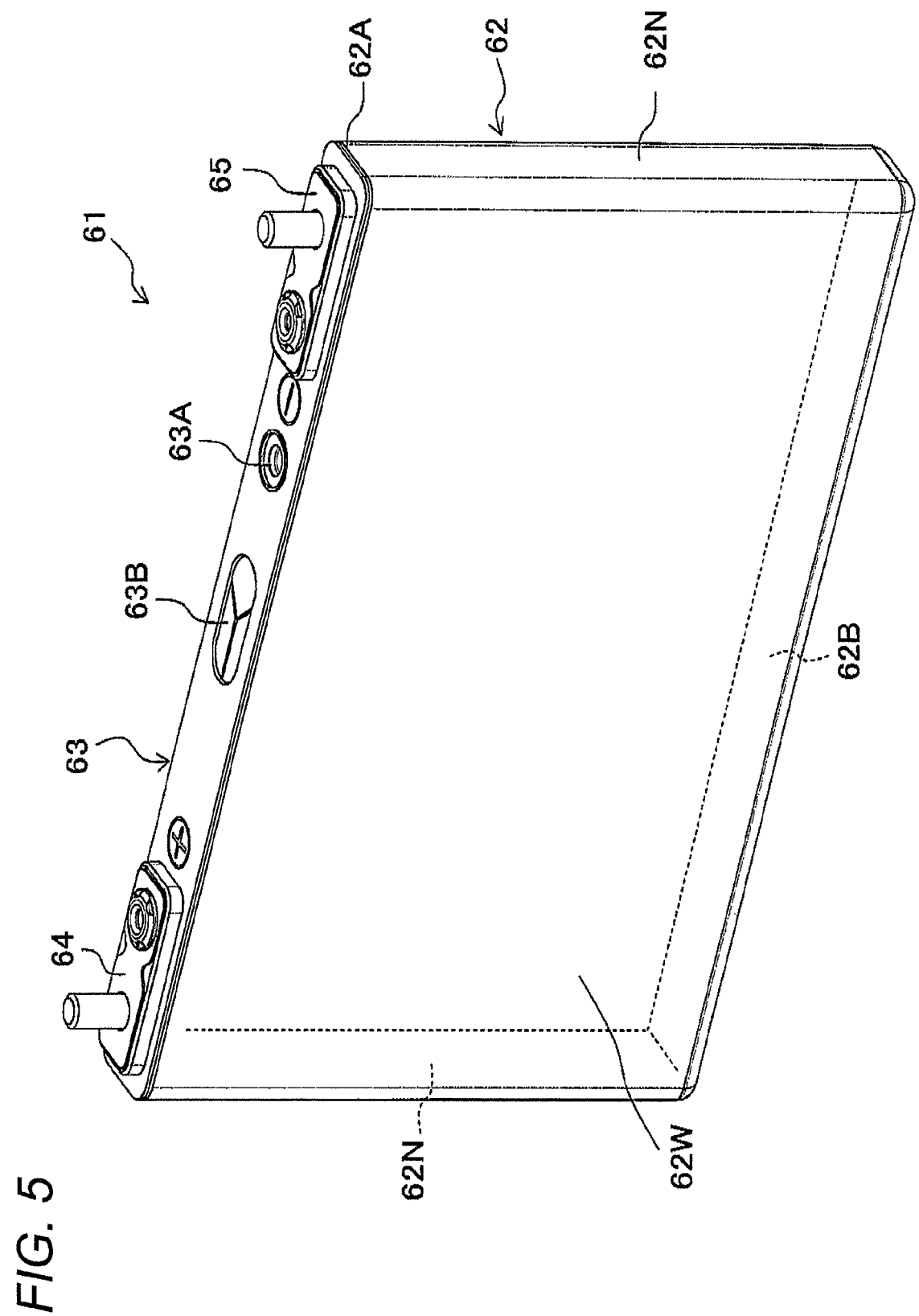
FIG. 5 is a perspective view of a square battery.

FIG. 5 is a perspective view of an appearance of the square battery 61.

The square battery 61 is a lithium ion secondary battery, for example, and has a structure in which a would type power generation element group is housed in a rectangular parallelepiped battery can 62 having one surface open through an insulating case, and an opening portion 62A of the battery can 62 is sealed with a battery lid 63. A container exterior is configured from the battery can 62 and the battery lid 63. A positive electrode terminal 64 and a negative electrode terminal 65 are provided in the battery lid 63 in a protruding manner. The positive electrode terminal 64 and the negative electrode terminal 65 are terminals that output the power generated in the wound type power generation element group in the battery can 62 to an outside, and charge the power generated at an outside in the wound type power generation element group.

The battery can 62 is made of metal, and the depth dimension is formed larger than the shorter side dimension of the opening portion by a deep drawing method. The battery can 62 is a flat container including a wide side surface 62W of a rectangular parallelepiped container with a bottom, having a large area, a narrow side surface 62N having a small area, and a bottom surface (can bottom surface) 62B that is the bottom surface of the container, and the opening portion 62A is included in the upper surface.

The battery lid 63 is fixed to the opening portion 62A of the battery can 62 by a laser beam welding method. Through holes to which the positive electrode terminal 64 and the negative electrode terminal 65 are respectively inserted are formed in the battery lid 63. Further, a liquid injection port 63A and a safety valve 63B are provided in the battery lid 3. The liquid injection port 63A is sealed by laser beam welding after an electrolyte is poured in the battery can 62. The safety valve 63B has a configuration to cleave when the pressure inside the battery can 62 is increased to a predetermined value or more, and to release the pressure inside the battery can 62.

<Intermediate Cell Holder>

Figure 6:
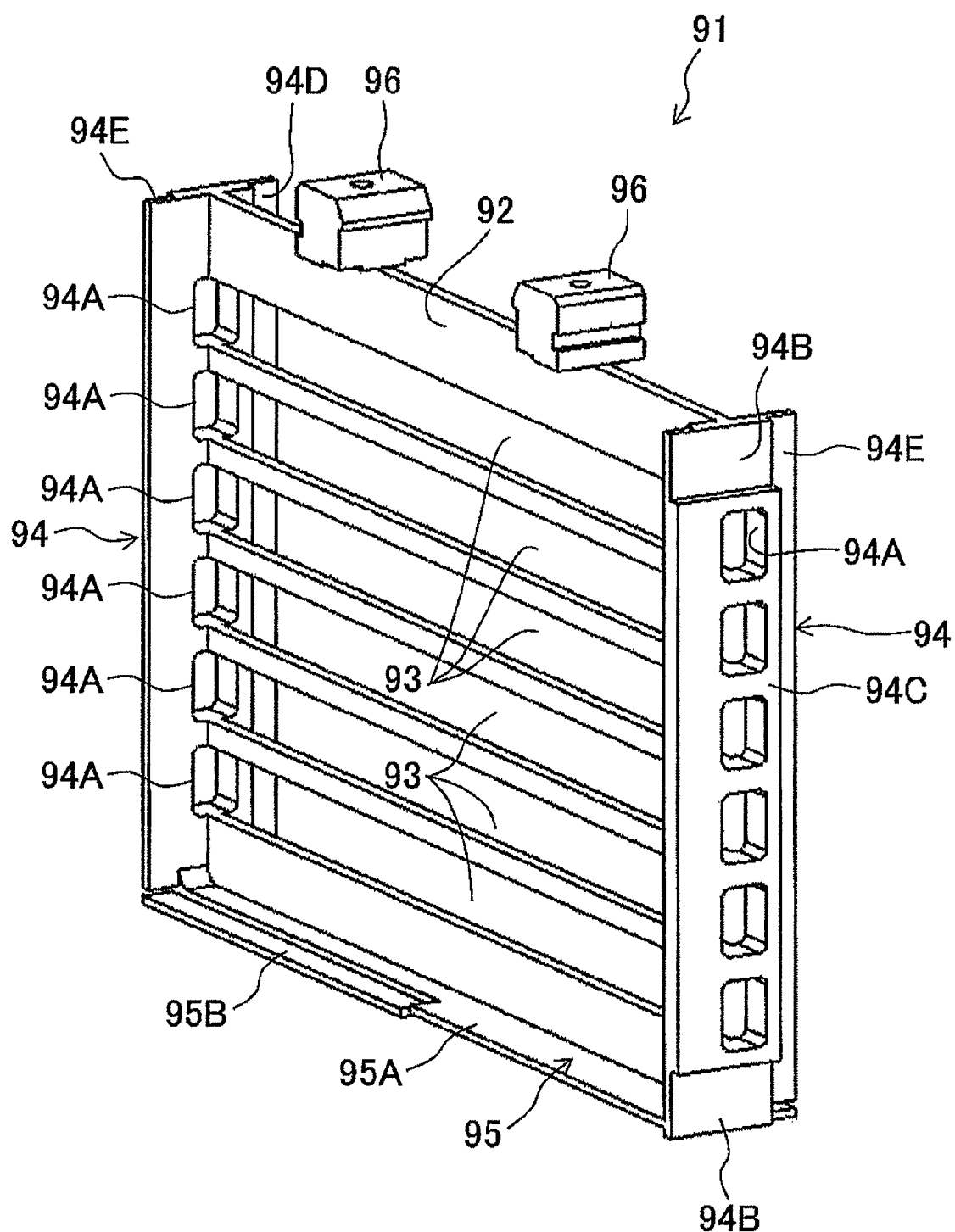
FIG. 6 is a perspective view of an intermediate cell holder.
Figure 7:
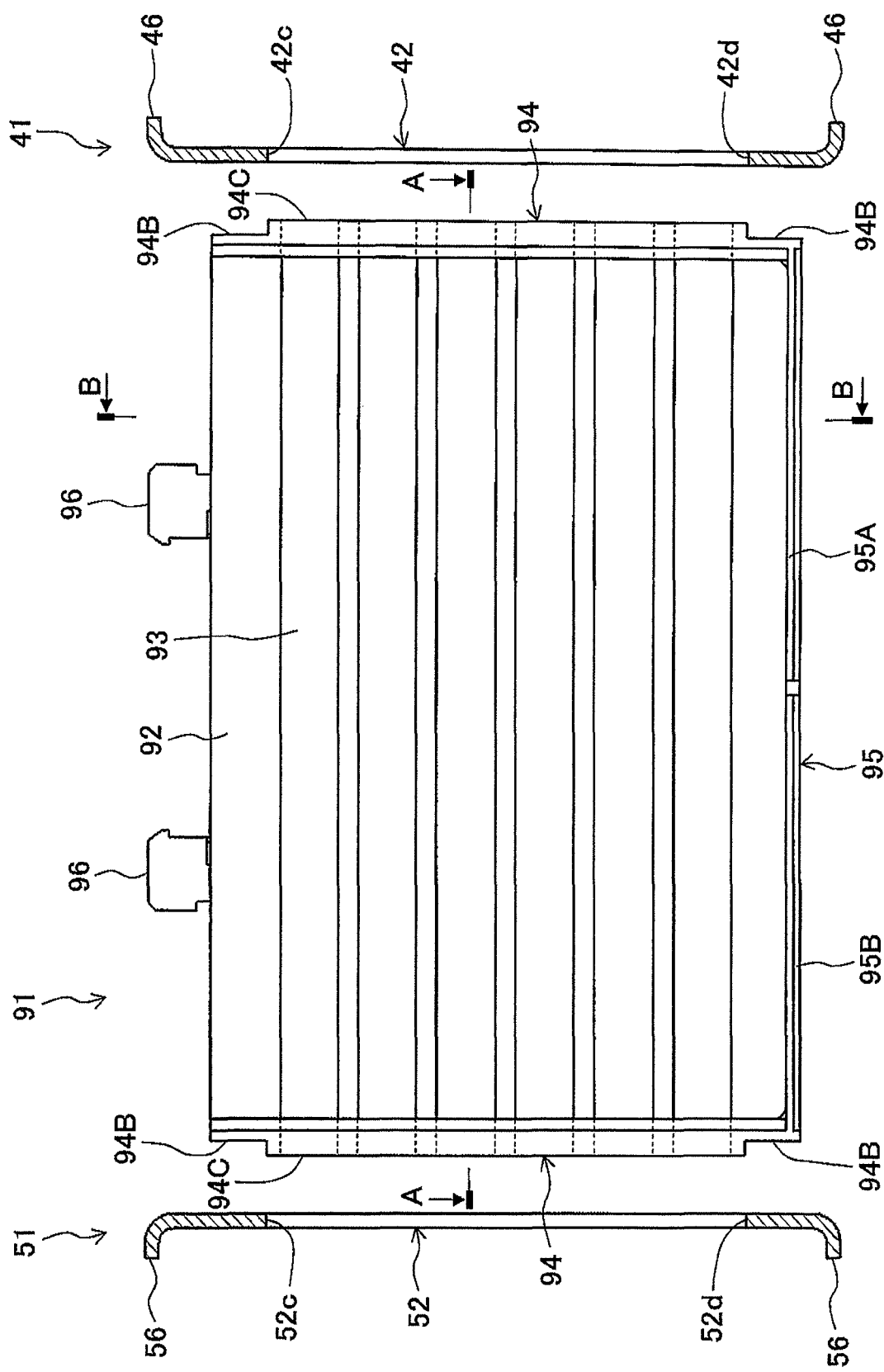
FIG. 7 is a front view of the intermediate cell holder.
Figure 8:
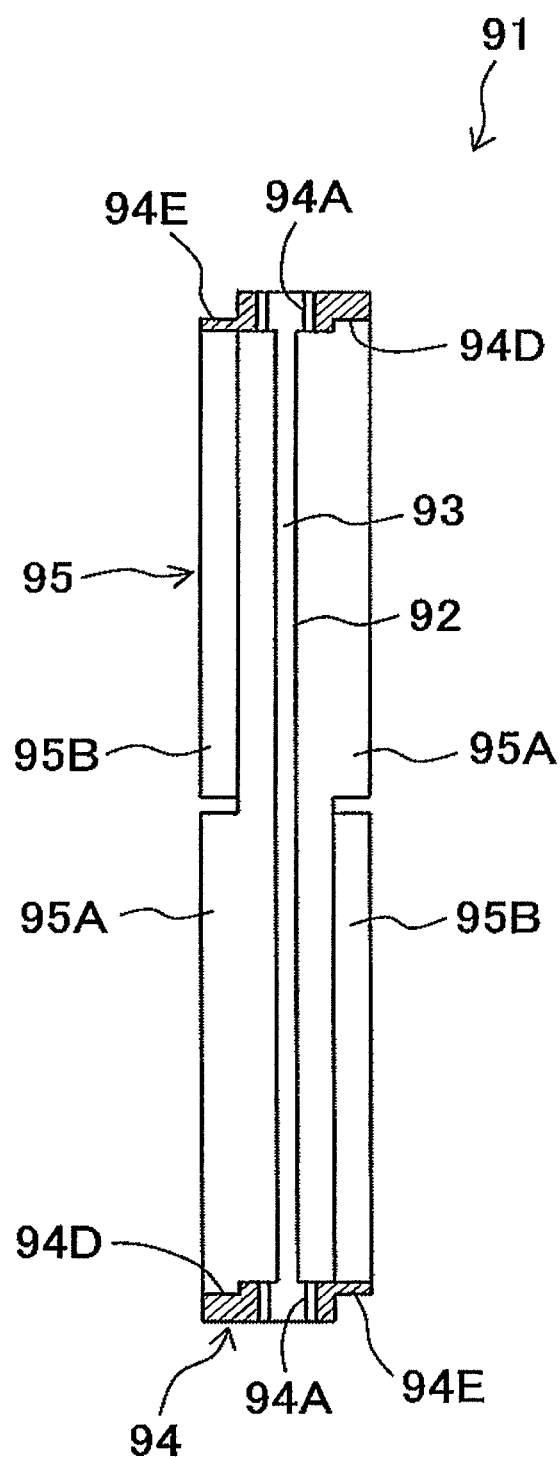
FIG. 8 is an A-A line cross sectional view of FIG. 7.
Figure 9:
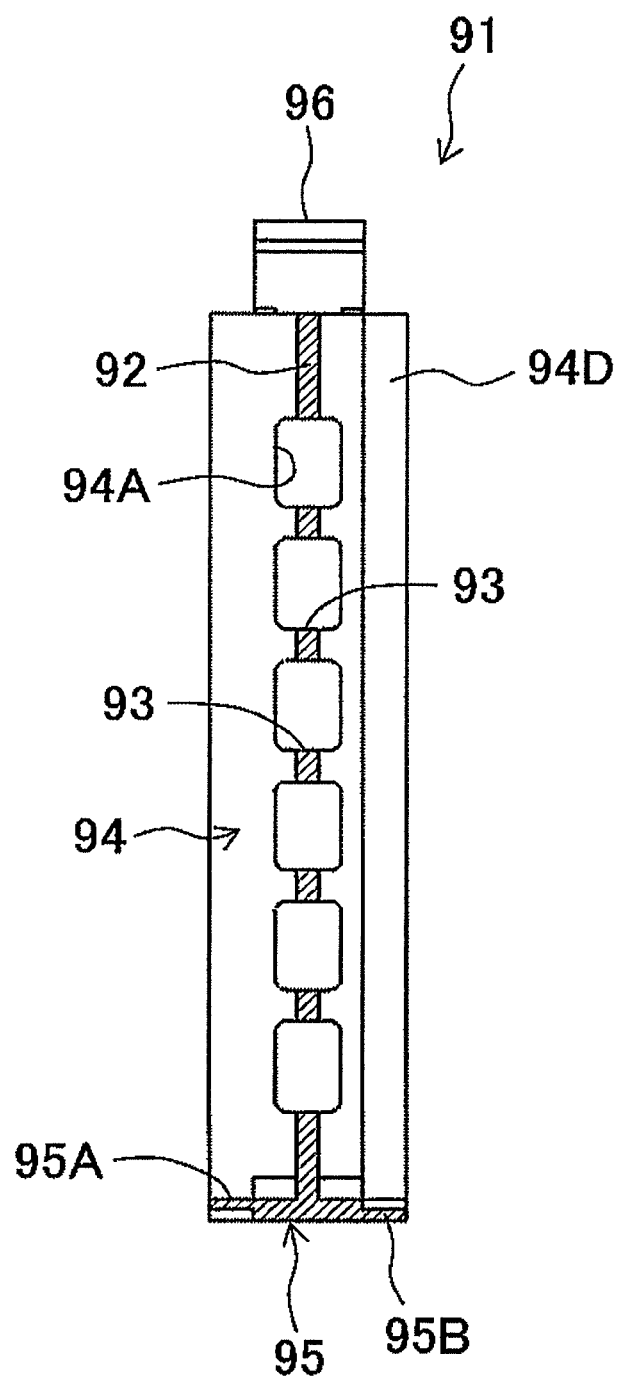
FIG. 9 is a B-B line cross sectional view of FIG. 7.
Figure 10:
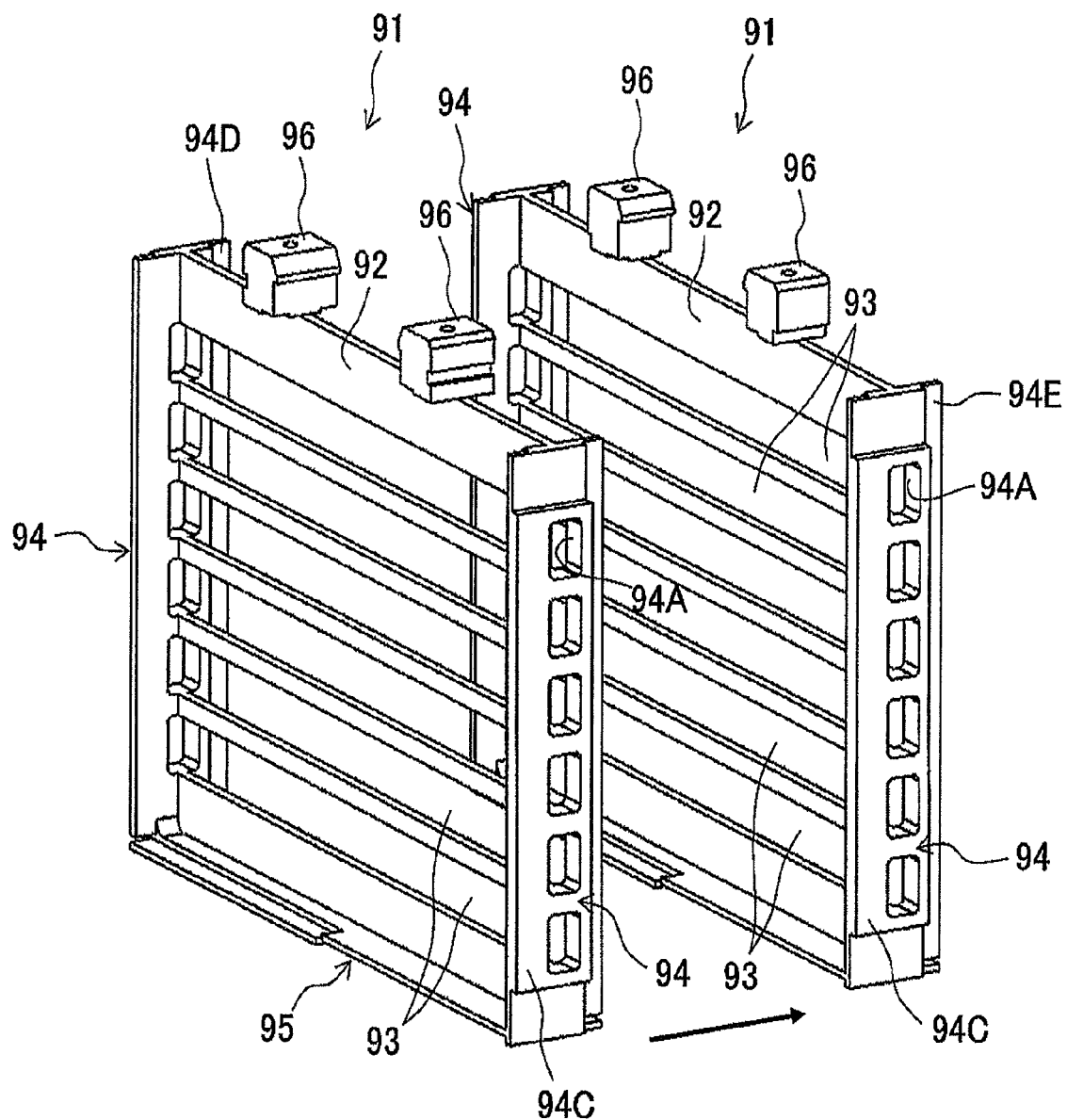
FIG. 10 is a perspective view describing an example of a coupling structure of the intermediate cell holder.

FIG. 6 is a perspective view of an intermediate cell holder, FIG. 7 is a front view of the intermediate cell holder, FIG. 8 is an A-A line cross sectional view of FIG. 7, FIG. 9 is a B-B line cross sectional view of FIG. 7, and FIG. 10 is a perspective view describing an example of a coupling structure of the intermediate cell holder.

The intermediate cell holder 91 includes a partition portion 92 intervening between and partitioning the wide side surface 62W of the square battery 61 at the one side Df in the layering direction and the wide side surface 62W of the square battery 61 at the other side Dr in the layering direction, and ventilation paths 93 penetrating the partition portion 92 in the layering direction and formed by being notched in the cell width direction, and communicating the wide side surface 62W of the square battery 61 at the one side Df in the layering direction and the wide side surface 62W of the square battery 61 at the other side Dr in the layering direction in the cell width direction.

The ventilation path 93 is formed by notching the partition portion 92 in the cell width direction, and thus the gap between the square batteries 61 can be made smaller, and a necessary flow rate of cooling air can be secured. Therefore, the device as a whole can be downsized. Further, the ventilation path 93 is linearly formed, and thus enables the cooling air to smoothly flow, whereby high cooling efficiency can be obtained.

The intermediate cell holder 91 includes a pair of side wall portions 94 and 94 protruding from both end portion of the partition portion 92 in the cell width direction into the one side and the other side in the layering direction, and facing the narrow side surfaces 62N of the square battery 61 at the one side Df and the other side Dr in the layering direction, respectively, and a bottom wall portion 95 protruding from an end portion of the partition portion 92 at one side in the cell height direction to the one side and the other side in the layering direction, and facing the bottom surfaces 62B of the square batteries 61 at the one side Df and the other side Dr in the layering direction.

Opening portions 94A communicating into the ventilation paths 93 are drilled in the side wall portion 94. Cooling air is introduced through the opening portions 94A at the one side of the cell block 11 in the cell width direction into the ventilation paths 93, and passed through the square batteries 61 arranged at the one side and the other side in the layering direction, and can flow out through the opening portions 94A at the other side in the cell width direction.

In the side wall portion 94, contact face portions 94B and 94B that are in contact with the side frames 41 and 51 are provided in end portion positions at the one side and the other side in the cell height direction, and salient portions 94C and 94C inserted into and engaged with the opening portions 42 and 52 of the side frames 41 and 51 are provided in central positions in the cell height direction.

The contact face portions 94B and 94B restricts the movement of the intermediate cell holder 91 in the cell width direction, and seals the intermediate cell holder 91 by being in contact with the side frames 41 and 51. The salient portions 94C and 94C are inserted into the opening portions 42 and 52 of the side frames 41 and 51, and upper end portions of the salient portions 94C and 94C face the upper end portions 42c and 52c of the opening portions 42 and 52, and lower end portions of the salient portions 94C and 94C face the lower end portions 42d and 52d of the opening portions 42 and 52, thereby restricting the movement of the intermediate cell holder 91 in the cell height direction.

In the side wall portions 94, overlapping face portions 94D and 94E, mutual end portions of which in the layering direction overlap in a direction perpendicular to the layering direction when the intermediate cell holders 91 are brought close to each other in the layering direction from the state illustrated in FIG. 10 and coupled, or when the end cell holder 81 is brought close to the intermediate cell holder 91 in the layering direction and coupled, are provided.

Similarly, in the bottom wall portion 95, overlapping face portions 95A and 95B, mutual end portions of which in the layering direction overlap in a direction perpendicular to the layering direction when the intermediate cell holders 91 are brought close to each other in the layering direction and coupled, or when the end cell holder 81 is brought close to the intermediate cell holder 91 in the layering direction, are provided.

Therefore, the mutually coupled cell holders can be prevented from being shifted in the direction perpendicular to the layering direction, and the layered state can be maintained. Further, the contact area of the adjacent cell holders can be widely secured, the air tightness can be improved, and leaking of the cooling air through the coupled portion of the cell holders can be prevented.

Figure 11:
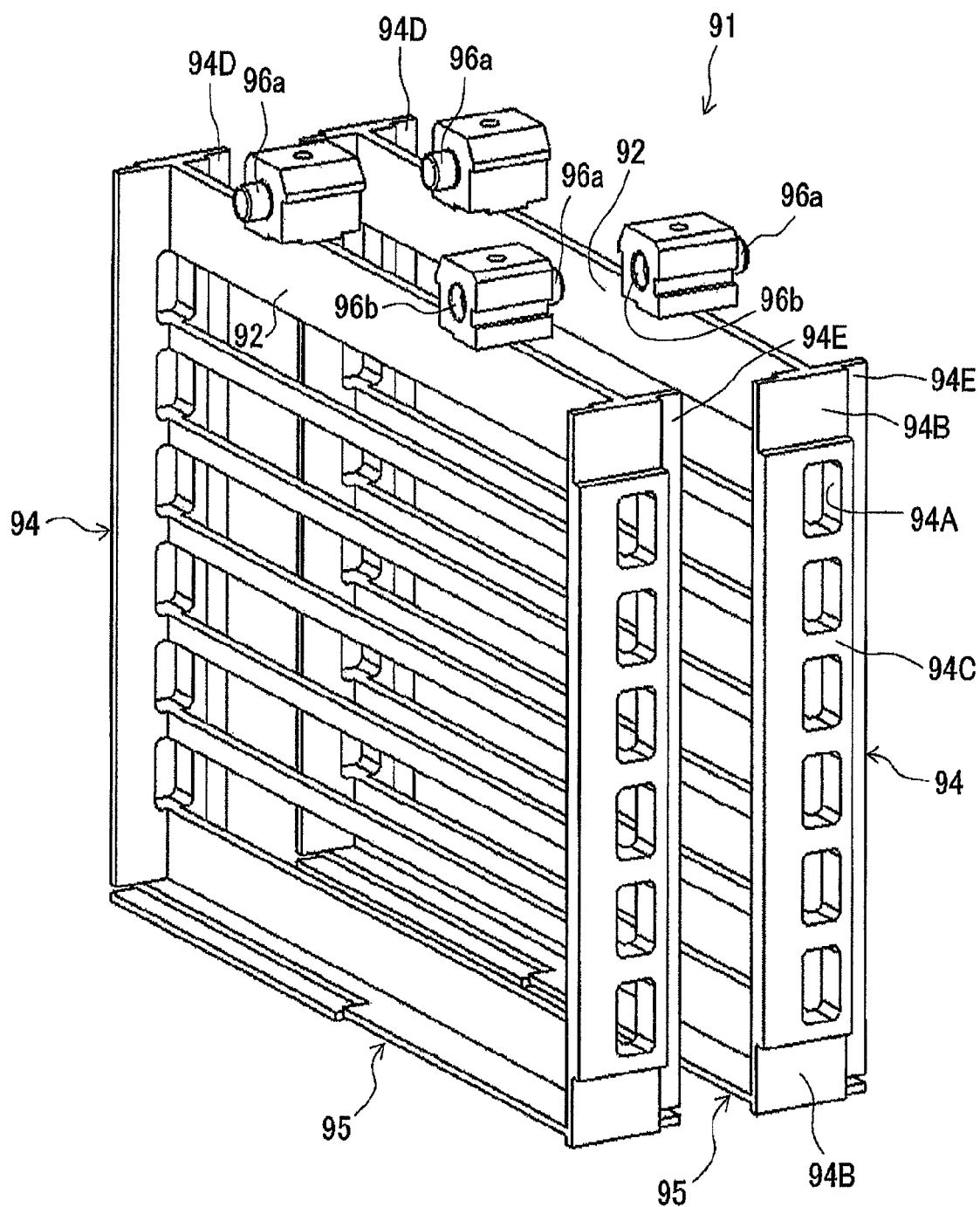
FIG. 11 is a perspective view describing another example of a coupling structure of the intermediate cell holder.

FIG. 11 is a perspective view describing another example of the coupling structure of the intermediate cell holder. A pair of pedestal parts 96 for fixing a base plate to the upper end portion of the partition portion 92 at the other side of the cell height is provided in the intermediate cell holder 91. The pedestal parts 96 are separately provided each other in the cell width direction, and have a block shape extending in the layering direction with an approximately rectangular cross section.

Between the pair of pedestal parts 96, in the pedestal part 96 at the one side Wl in the cell width direction, a columnar dowel 96a is provided in a protruding manner in an end surface at the one side in the layering direction and a dowel hole 96b is drilled in an end surface at the other side in the layering direction. Further, in the pedestal part 96 at the other side Wr in the cell width direction, a dowel hole 96b is drilled in the end surface at the one side in the layering direction, and a dowel 96a is provided in a protruding manner in the end surface at the other side in the layering direction.

The dowel 96a and the dowel hole 96b are mutually fit by coupling the intermediate cell holders 91 in the layering direction. Therefore, the other side Hu of the intermediate cell holder 91 in the cell height direction can be coupled and fixed in the layering direction. Therefore, the plurality of intermediate cell holders 91 can be easily layered, and the assembly work becomes easier.

<End Cell Holder>

Figure 12:
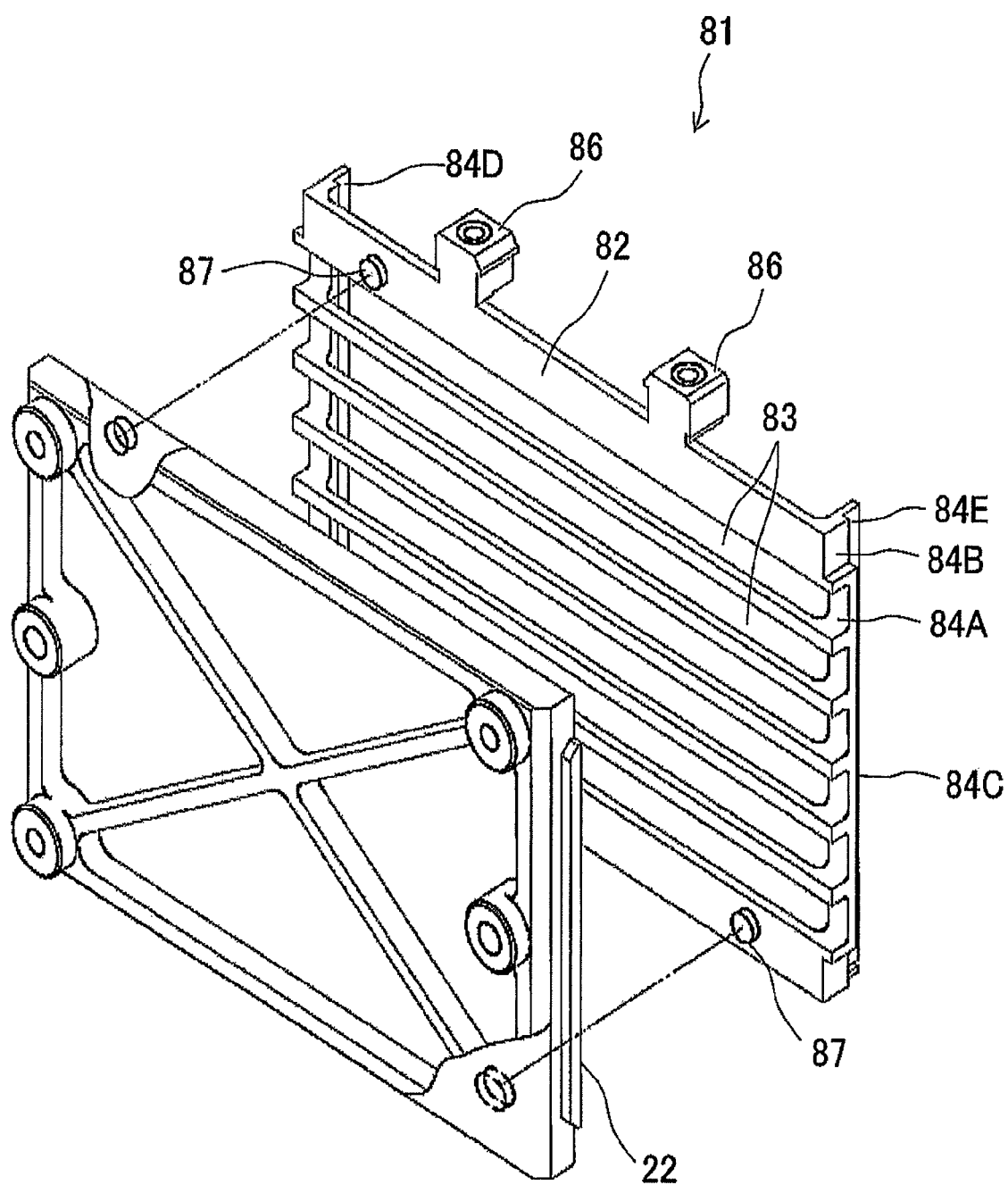
FIG. 12 is a perspective view describing a coupling structure of the end plate and an end cell holder.
Figure 13:
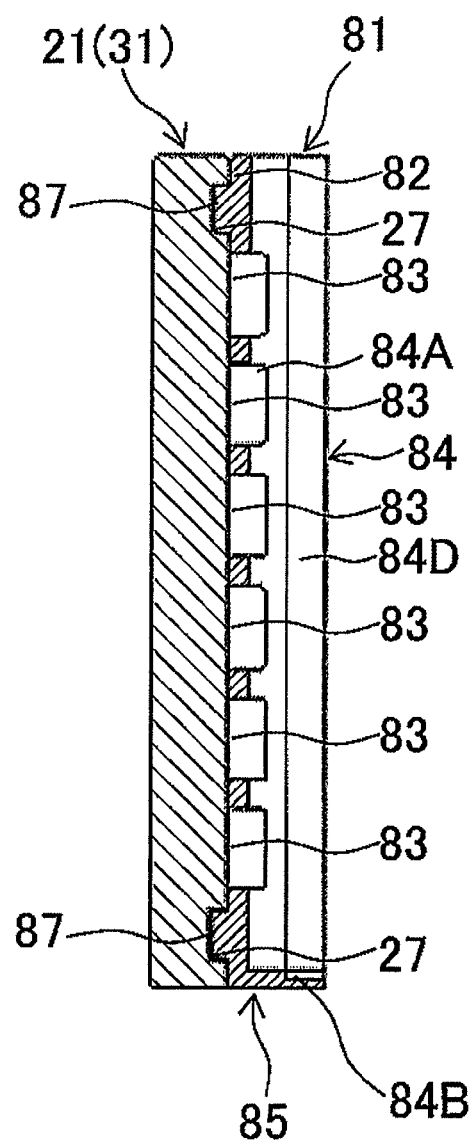
FIG. 13 is a cross sectional view illustrating a coupled state of the end plate and the end cell holder.

FIG. 12 is a perspective view describing a coupling structure of the end plate and the end cell holder, and FIG. 13 is a cross sectional view illustrating a coupled state of the end plate and the end cell holder. Note that, in the following description, the configuration of the end cell holder 81 at the one side in the layering direction will be described, and description of the end cell holder 81 at the other side in the layering direction is omitted.

The end cell holder 81 has a shape dividing the intermediate cell holder 91 into two at a central position in the layering direction.

The end cell holder 81 includes a partition portion 82 intervening between and partitioning the end plate 21 and the square battery 61, and a ventilation path 83 penetrating the partition portion 82 in the layering direction and formed by being notched in the cell width direction, and communicating the one side and the other side of the end cell holder 81 in the cell width direction.

The end cell holder 81 includes a pair of side wall portions 84 and 84 protruding from both end portions of the partition portion 82 in the cell width direction to the other side in the layering direction, and facing the narrow side surfaces 62N of the square batteries 61 at the other side Dr in the layering direction, and a bottom wall portion 85 protruding from an end portion of the partition portion 82 at the one side in the cell height direction to the other side Dr in the layering direction, and facing the bottom surface 62B of the square battery 61 at the other side Dr in the layering direction.

Opening portions 84A communicating to the ventilation paths 83 are drilled in the side wall portion 84. The cooling air is introduced through the opening portions 84A at the one side of the cell block 11 in the cell width direction into the ventilation paths 83, passed through the square batteries 61 arranged at the other side Dr in the layering direction, and can flow out through the opening portions 94A at the other side Wr in the cell width direction.

In the side wall portion 94, contact face portions 84B and 84B that are in contact with the side frames 41 and 51 are provided in end portion positions at the one side Hd and the other side Hu in the cell height direction, and salient portions 84C and 84C inserted into and engaged with the opening portions 42 and 52 of the side frames 41 and 51 are provided in central positions in the cell height direction.

The contact face portions 84B and 84B restrict movement of the end cell holder 81 in the cell width direction and seal the end cell holder 81 by being in contact with the side frames 41 and 51. By the salient portions 84C being inserted into the opening portions 42 and 52, upper end portions of the salient portions 84C face the upper end portions 42c and 52c of the opening portions 42 and 52 and lower end portions of the salient portions 84C face the lower end portions 42d and 52d of the opening portions 42 and 52, and the movement of the intermediate cell holder 91 in the cell height direction is restricted.

Overlapping face portions 84D and 84E, mutual end portions of which in the layering direction overlap in a direction perpendicular to the layering direction, when the intermediate cell holders 91 are brought close in the layering direction and coupled, are provided in the side wall portion 84.

Similarly, in the bottom wall portion 85, overlapping face portions 85A and 85B, mutual end portions of which in the layering direction overlap in a direction perpendicular to the layering direction, when the intermediate cell holders 91 are brought close in the layering direction and coupled, are provided.

Therefore, the mutually coupled cell holders can be prevented from being shifted in the direction perpendicular to the layering direction, and the layered state can be maintained. Further, the contact area of the adjacent cell holders can be widely secured, the air tightness can be improved, and leaking of the cooling air through the coupled portion of the cell holders can be prevented.

Positioning pins 87 for positioning with respect to the end plates 21 and 31 are provided in an outer side surface of the end cell holder 81 in a protruding manner. The positioning pins 87 are arranged at positions in a diagonal line on the outer side surface of the end cell holder 81. As illustrated in FIG. 13, the positioning pins 87 are inserted into positioning holes 27 recessed in facing surfaces of the end plates 21 and 31, whereby relative positioning can be performed. Note that, in FIGS. 12 and 13, a part of a configuration of an outer end portion of the end plate 21 is omitted.

<Method of Assembling Secondary Battery Module>

First, a predetermined number of intermediate cell holders 91 are prepared, and the square batteries 61 are put between the intermediate cell holders 91 and held while the intermediate cell holders 91 and the square batteries 61 are mutually coupled in layering direction. Then, the end cell holders 91 are coupled with the both end portions in the layering direction to form the cell block 11.

Then, the end plates 21 and 31 are arranged at both sides of the cell block 11 in the layering direction, compressed in the layering direction at predetermined compression force, and held in a compressed state. Then, the side frames 41 and 51 are brought close from both sides of the cell block 11 in the cell width direction, and the protrusion portions 22 and 33 of the end plates 21 and 31 at the one side Wl in the cell width direction are inserted into the opening portions 42 of the side frame 41 at the one side Wl in the cell width direction, and the protrusion portions 22 and 33 of the end plates 21 and 31 at the other side Wr in the cell width direction into the opening portions 52 of the side frame 51 at the other side Wr in the cell width direction. With the insertion work, the salient portions 84C and 84c of the end cell holder 81 and the salient portions 94C and 94C of the intermediate cell holder 91 are inserted into the opening portions 42 and 52.

Then, the locking claws 44 and 44 are engageably inserted into the locking holes 24 and 34 of the end plates 21 and 31, and the side frame 41 is fixed to the end plates 21 and 31. Similarly, the locking claws 54 and 54 are engageably inserted into the locking holes 24 and 34 of the end plates 21 and 31, and the side frame 51 is fixed to the end plates 21 and 31.

Since the locking claws 44 and 54 are locked into the locking holes 24 and 34, in the assembly work, the side frames 41 and 51 attached in a state where the cell block 11 is compressed in the layering direction are prevented from coming off the end plates 21 and 31 before the compression state is released, and the assembly work can be made easier. Following that, with the attachment of the fixing screws 10, the side frames 41 and 51 are fastened to the end plates 21 and 31, and the compression of the cell block 11 is released after the fastening.

According to the above-described configuration, the square batteries 61 are compressed in an elastic region, and the protrusion portions 22 and 32 of the end plates 21 and 31 are engaged with the opening portions 42 and 52. Therefore, self-fastening can be realized, and the assembly work can be made easier. Further, compared with a conventional method of performing fixing with a band, looseness does not occur and appropriate fastening force can be maintained.

Figure 14:
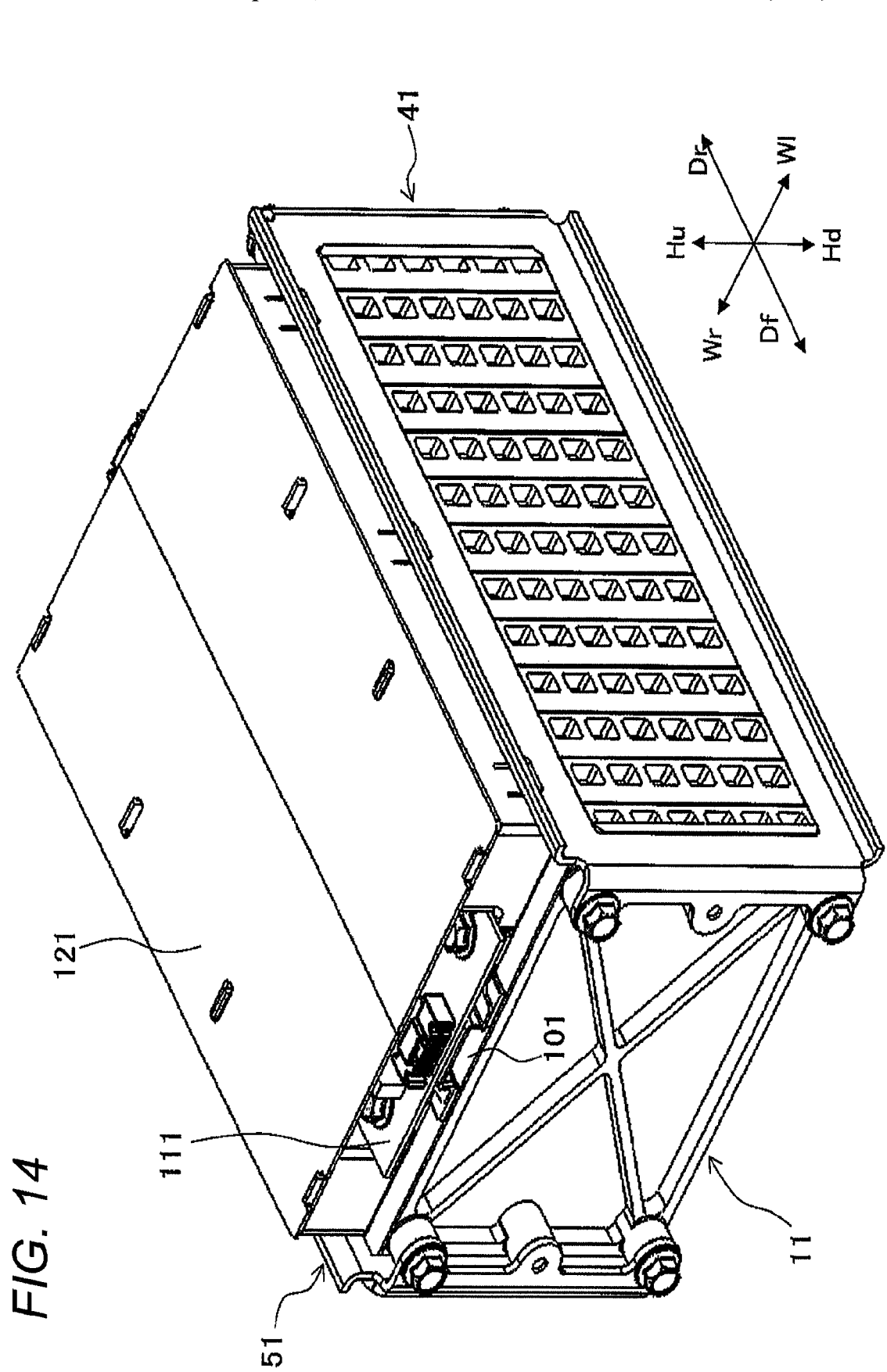
FIG. 14 is a perspective view illustrating a completion state of assembly of the cell blocks.
Figure 15:
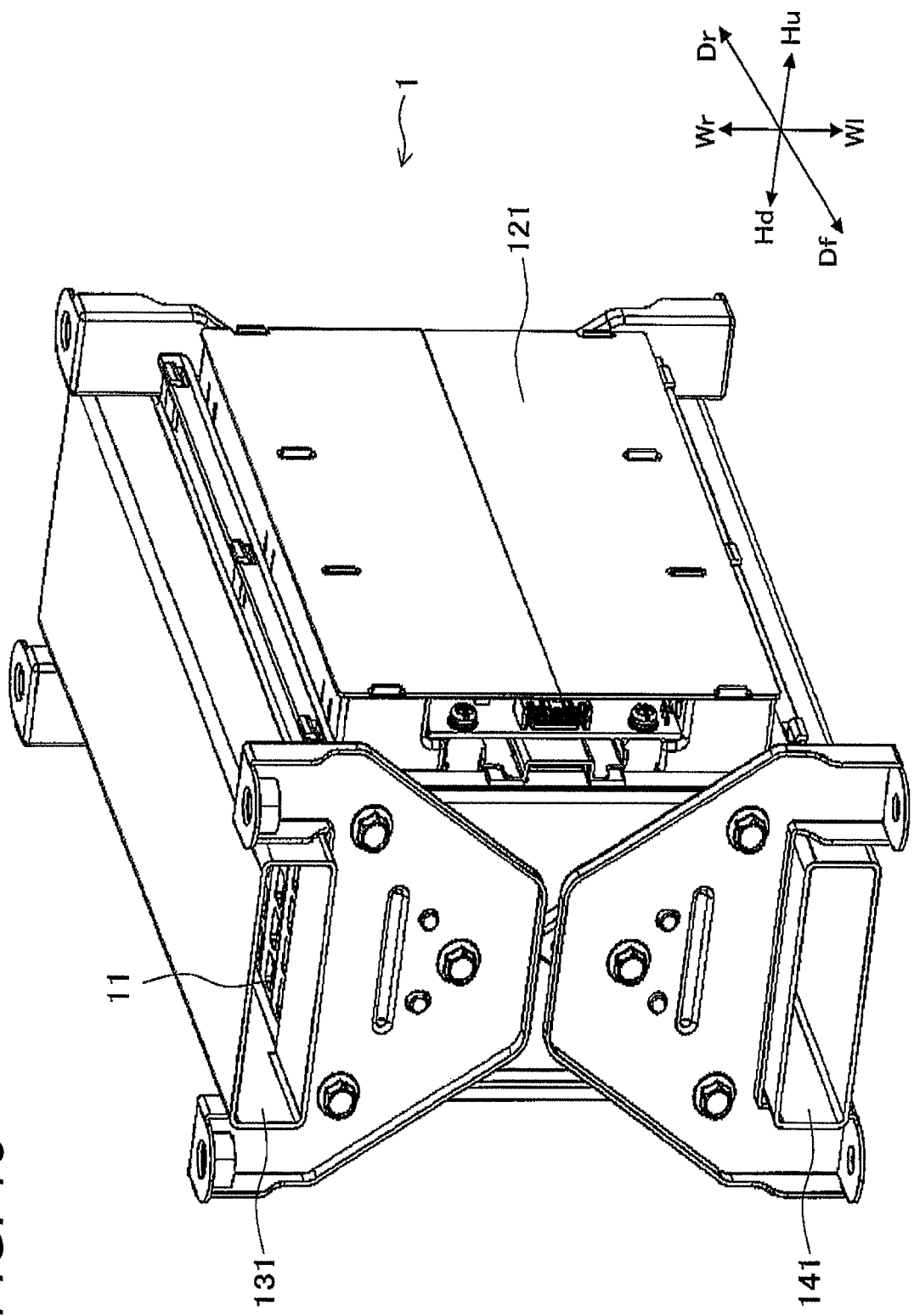
FIG. 15 is a perspective view illustrating a completion state of assembly of the secondary battery module.

As illustrated in FIG. 14, a gas discharge passage 101, a control circuit substrate 111, and a cover member 121 are attached to the cell block 11 at the other side Hu in the cell height direction. Further, as illustrated in FIG. 15, an air intake duct 141 is coupled to the one side Wl in the cell width direction, and an air exhaust duct 131 is connected to the other side Wr in the cell width direction, so that a state of completion of assembly of the secondary battery module 1 is achieved. Note that the air intake duct and the air exhaust duct may be a combination opposite to the above combination, and do not limit the directivity of the air flow.

Further, when a coolant is used as a cooling medium, a cooling plate in which the coolant circulates is arranged facing the one side Hd of the cell block 11 illustrated in FIG. 15 in the cell height direction. In that case, the cell holder 91 does not include the bottom wall portion 95, and has a configuration in which a can bottom 62B of a square battery 61 and the cooling plate are thermally coupled. Note that a structure in which a thermal conductive sheet is inserted between the can bottom 62B of the square battery 61 and the cooling plate for compensating the thermal coupling may be employed. The cooling plate is attached with being pressed to the cell block 11 by a clip as an elastic member. The clip presses the cooling plate to the cell block 11 with predetermined pressing force by elastic deformation.

The secondary battery module 1 may have a configuration in which a pair of cell blocks 11 is arranged in a posture state where one sides in the cell height direction face each other, and the cooling plate intervenes between the pair of cell blocks. With such a configuration, a pair of cell blocks 11 can be cooled by a single cooling plate at the same time, and the downsizing of the module as a whole and energy saving can be achieved.

The embodiments of the present invention have been described. However, the present invention is not limited to the above-described embodiments, and various modifications of design can be made within the scope without departing from the spirit of the invention described in the claims. For example, the embodiments have been described in detail for easily describing the present invention, and are not limited to one that includes all of the described configuration. Further, a part of a configuration of one embodiment can be replaced with a configuration of another embodiment, and a configuration of another embodiment can be added to a configuration of one embodiment. Further, a part of a configuration of each embodiment can be added/deleted/replaced to/from/with another configuration.

REFERENCE SIGNS LIST 1 secondary battery module
10 fixing screw (fastening member)
11 cell block
61 square battery
21 and 31 end plate
22 and 32 protrusion portion
24 and 34 locking hole
41 and 51 side frame
42 and 52 opening portion
43 and 53 flange
44 and 54 locking claw
81 end cell holder
82 partition portion
91 intermediate cell holder
92 partition portion

The invention claimed is:

1. A secondary battery module including a cell block in which a plurality of square batteries are layered, the secondary battery module comprising:
   a pair of end plates including a first end plate and a second plate arranged respectively facing one side and another side of the cell block in a layering direction; and
   a pair of side frames including a first side frame and a second side frame arranged to respectively face one side and another side in the cell width direction perpendicular to the layering direction of the cell block, each side frame including:
      a first end portion engaged with the first end plate at the one side in the layering direction and a second end portion engaged with the second end plate at the another side in the layering direction, and a pair of horizontally-extending members connected to each other by a pair of vertically-extending members and defining an opening portion defined between the first end portion and the second end portion,
   wherein the cell block includes a cell holder that holds the square batteries, the cell holder including an intermediate cell holder disposed between the square batteries, the intermediate cell holder including first and second salient portions respectively inserted into the opening portions of the pair of side frames, and engaged with the pair of side frames at the one side and the another side of the cell block in the cell width direction,
   wherein each of the first and second end plates includes first and second protrusion portions respectively protruding toward the one side and the other side in the cell width direction,
   wherein the opening portion of the first side frame includes a first opening which is open from the first protrusion portion of the first end plate to the first protrusion portion of the second end plate, and the first protrusion portions of the first and second end plates and the first salient portion of the intermediate battery holder are inserted into the first opening, and
   the opening portion of the second side frame includes a second opening which is open from the second protrusion portion of the first end plate to the second protrusion portion of the second end plate, and the second protrusion portions of the first and second end plates and the second salient portion of the intermediate battery holder are inserted into the second opening.

2. The secondary battery module according to claim 1, wherein each of the side frames includes a pair of flanges respectively bending toward one end and other end at the one end portion and the other end portion, and respectively facing an outer end surface of the end plate at the one side in the layering direction and an outer end surface of the end plate at another side in the layering direction.

3. The secondary battery module according to claim 2, wherein a locking claw protruding in the layering direction is provided in one of the outer end surface of the end plate, and the flange facing the outer end surface, and a locking hole into which the locking claw is engageably inserted is recessed in other of the outer end surface of the end plate, and the flange facing the outer end surface.

4. The secondary battery module according to claim 2, wherein a through hole into which a fastening member is inserted is formed penetrating the flange of the side frame along the layering direction, and
   a fastening hole to which the fastening member inserted into the through hole of the flange is fastened is provided in the outer end surface of the end plate.

5. The secondary battery module according to claim 1, wherein each side frame has a L-shaped cross section, a U-shaped cross section, or a square pipe-typed cross section.

6. The secondary battery module according to claim 1, wherein the cell holder further includes
   a pair of end cell holders respectively intervening between the end plates and the square batteries, and
   a plurality of intermediate cell holders mutually coupled between the pair of end cell holders in the layering direction, each intermediate cell holder intervening between a first square battery at the one side in the layering direction and a second square battery at another side in the layering direction,
   wherein each square battery is configured to be put in from both sides in the layering direction and held by one of the end cell holders and one of the intermediate cell holders or a pair of the intermediate cell holders.

7. The secondary battery module according to claim 6, wherein each intermediate cell holder includes
   a partition portion intervening between and partitioning the first square battery at the one side in the layering direction and the second square battery at the another side in the layering direction, and
   a ventilation path penetrating the partition portion in the layering direction and formed by being notched in the cell width direction, and communicating one side and other side of the intermediate cell holder in the cell width direction.

8. The secondary battery module according to claim 6, wherein each end cell holder includes
   a partition portion intervening between and partitioning the end plate and the square battery, and
   a ventilation path penetrating the partition portion in the layering direction and notch-formed in the cell width direction, and communicating one side and other side of the end cell holder in the cell width direction.

9. The secondary battery module according to claim 6, wherein each end cell holder and an adjacent intermediate cell holder include overlapping portions, mutual end portions of which in the layering direction overlap in a direction perpendicular to the layering direction when the end cell holder and the intermediate cell holder are mutually coupled in the layering direction.

10. The secondary battery module according to claim 7, wherein the end cell holder includes
   a partition portion intervening between and partitioning the end plate and the square battery, and
   a ventilation path penetrating the partition portion in the layering direction and notch-formed in the cell width direction, and communicating the one side and the other side of the end cell holder in the cell width direction.

11. The secondary battery module of claim 1, wherein the first and second protrusion portions of each end plate extends into a respective one of the first and second openings of a respective side frame such that movement of the end plates away from each other in the layering direction is restricted.

12. The secondary battery module according to claim 1, wherein the protrusion portions are elongated in the direction perpendicular to the layering direction and contact the vertically extending members of the side frames.

* * * * *